Sept. 8, 1964 P. E. SUHRE 3,147,814
ENGINE COOLING AND SILENCING SYSTEM
Filed Feb. 26, 1962 4 Sheets-Sheet 2
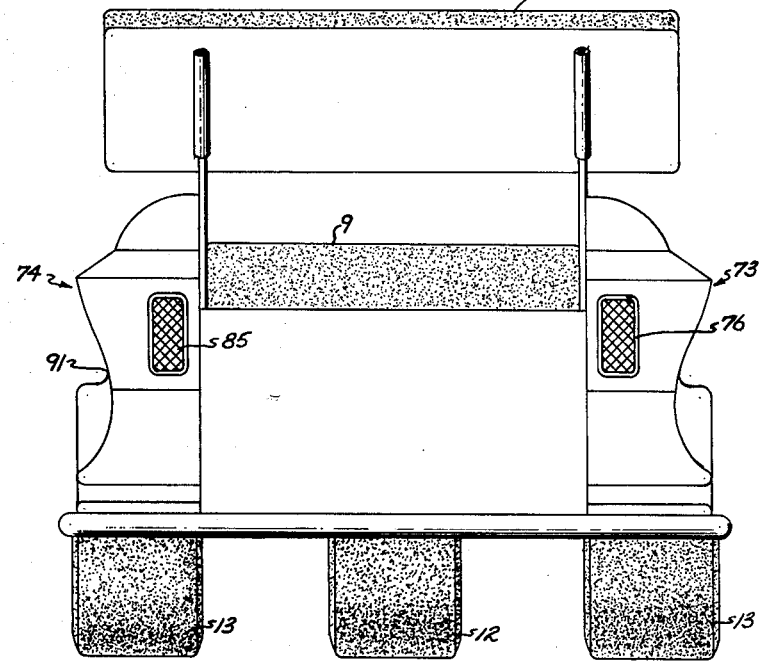
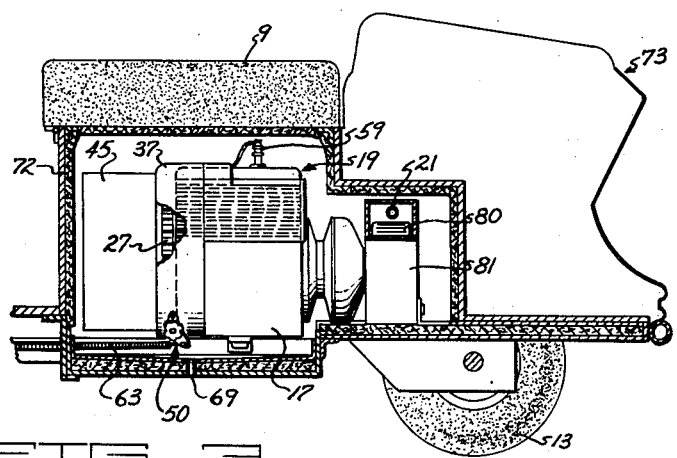
INVENTOR.
PEARCE E. SUHRE
BY
ATTORNEY Sept. 8, 1964 P. E. SUHRE 3,147,814
ENGINE COOLING AND SILENCING SYSTEM
Filed Feb. 26, 1962 4 Sheets-Sheet 3

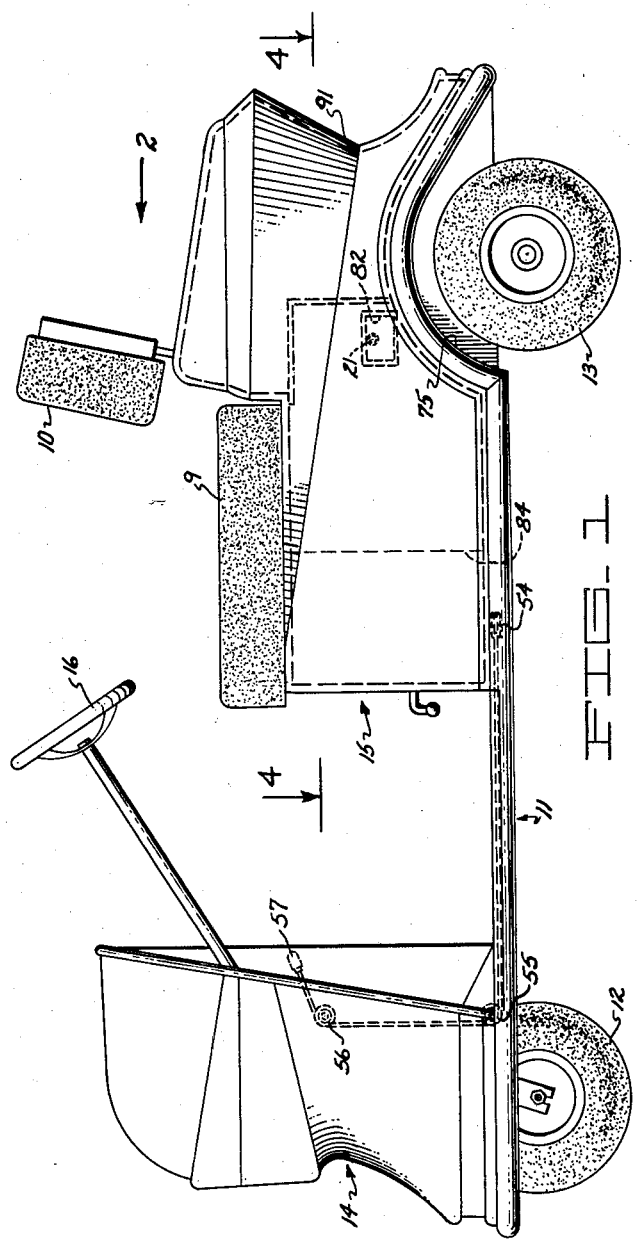

INVENTOR.
PEARCE E. SUHRE
BY
ATTORNEY

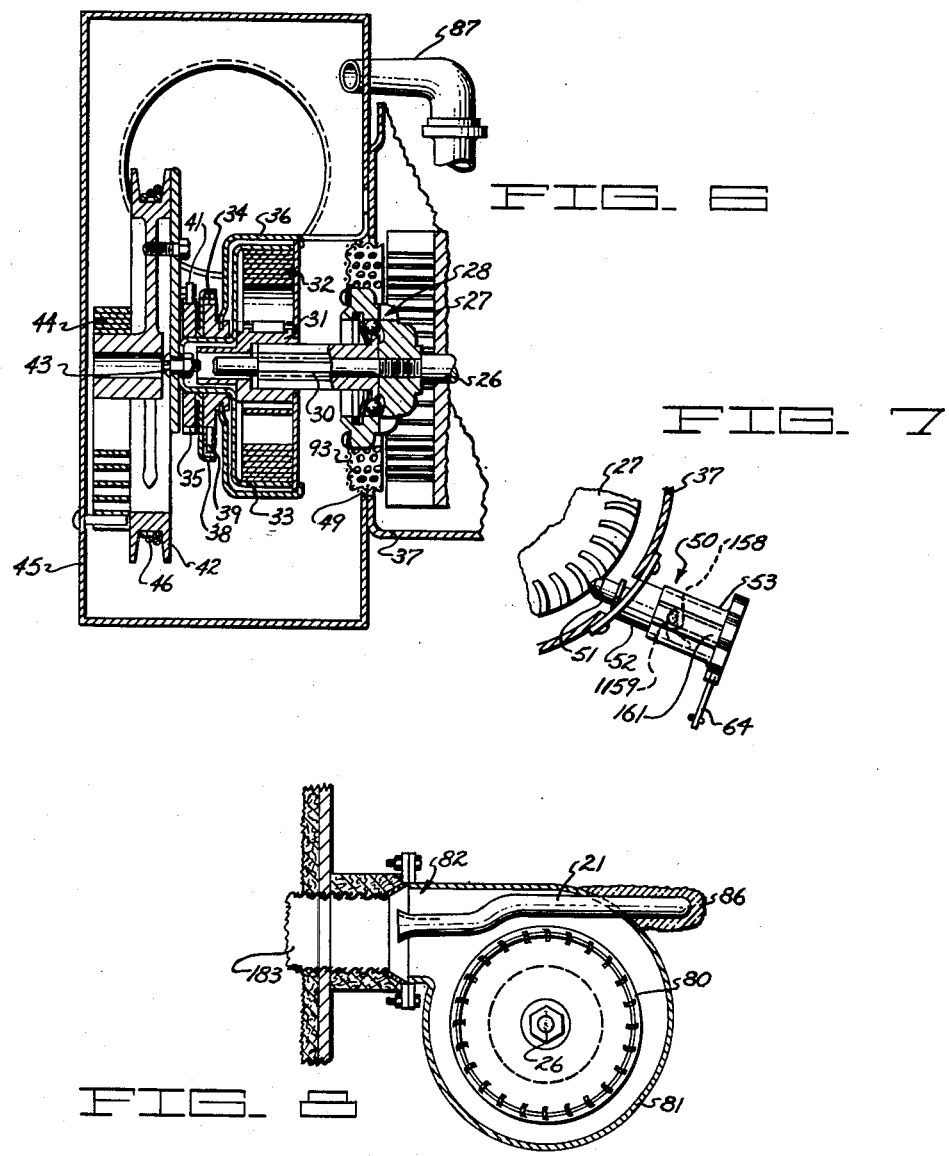

United States Patent Office  3,147,814
Patented Sept. 8, 1964

3,147,814
ENGINE COOLING AND SILENCING SYSTEM
Pearce E. Suhre, North Hollywood, Calif., assignor to Clary Corporation, San Gabriel, Calif., a corporation of California
Filed Feb. 26, 1962, Ser. No. 175,674
5 Claims. (Cl. 180—54)

This invention relates to relatively small internal combustion engines and has particular reference to motor vehicles driven by such engines and to means for cooling and silencing such internal combustion engines.

Motor vehicles of the above type are used for many purposes. However, their use is restricted due to noise emanating from the exhaust gases and from the engine. Therefore, they have not proved satisfactory for use in certain instances such as on golf courses, in industrial plants and the like where noise abatement is of paramount importance. For this reason, principally, electrically operable motor vehicles have generally been preferred except where noise is not a factor.

Attempts have been made heretofore to use mufflers or silencers of conventional construction to muffle the exhaust gases. However, it was found that in order to effectively silence the exhaust gases to a point where the reduction in noise approaches that of an electric vehicle, a large part of the power of the engine is used up in forcing the exhaust gases through the muffler or other silencing equipment. This, in turn, induces engine cooling problems and still does not solve the problem of reducing noises emanating from the engine itself. Attempts to sound-proof an air cooled engine by surrounding the same with a sound-proof casing or the like have resulted in further engine cooling problems.

It therefore becomes a principal object of the present invention to effectively muffle the exhaust and engine noises of an internal combustion engine without wasting an undue amount of power.

Another object is to effectively cool and muffle an internal combustion air cooled engine.

Another object is to utilize a portion of the body of an internal combustion engine driven vehicle to form an exhaust and engine sound muffling device.

Another object is to utilize engine cooling air to cool and dissipate exhaust gas noises.

A further object is to facilitate manual starting of an internal combustion engine.

The manner in which the above and other objects of the invention are accomplished will be readily understood on reference to the following specification when read in conjunction with the accompanying drawings, wherein:

FIG. 1 is a side view of a motor vehicle embodying a preferred form of the present invention.

FIG. 2 is a rear end view of the vehicle and is taken in the direction of the arrow 2 of FIG. 1.

FIG. 3 is a sectional view taken substantially along the line 3—3 of FIG. 4.

FIG. 6 is a sectional view illustrating the engine starting mechanism and is taken substantially along the line 6—6 of FIG. 4.

FIG. 7 is a fragmentary sectional view taken substantially along the line 7—7 of FIG. 4 illustrating the device for locking the engine against rotation.

FIG. 8 is a sectional view taken along the line 8—8 of FIG. 4.

Figure 4:
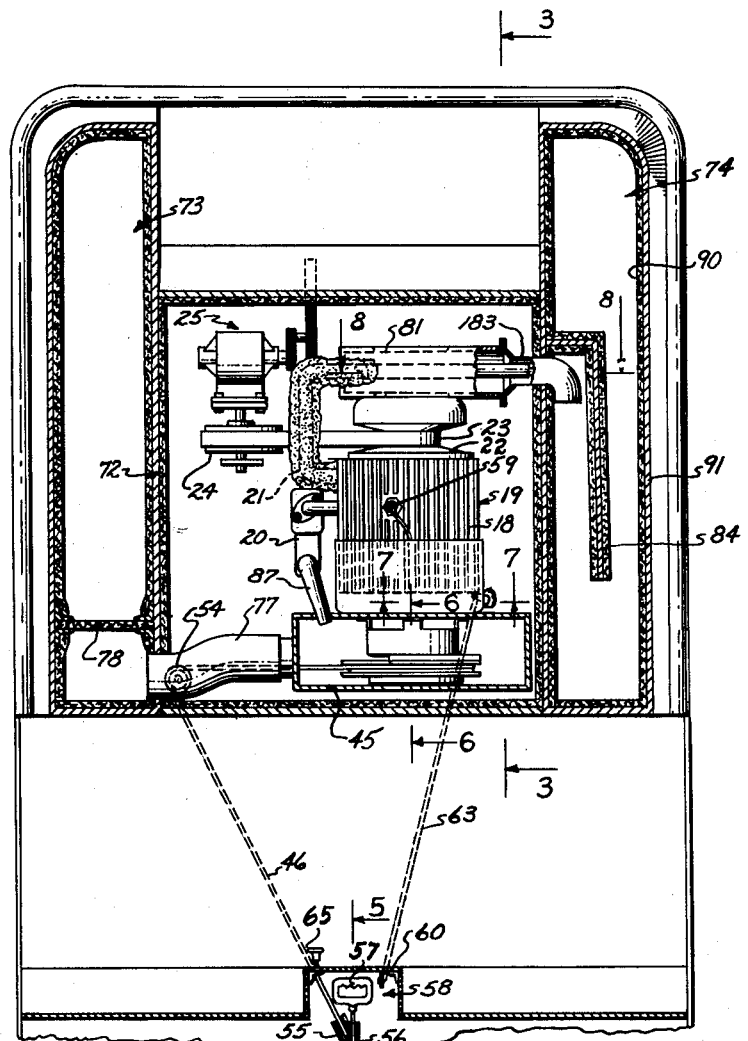
FIG. 4 is a sectional plan view taken substantially along the line 4—4 of FIG. 1.

The vehicle chosen for illustration in connection with the present invention is relatively small, having a chassis generally indicated at 11, a steerable front wheel 12 and two rear wheels 13. The body is in two main parts comprising a forward body part 14 and a rear body part 15.

The forward body part houses steering gear for the wheel 12, including a steering wheel 16. The rear body part houses an internal combustion engine, generally indicated at 19, and power transmission mechanism for the rear wheels 13. A seat 9 and back rest 10 for the occupants are mounted on the rear body part.

The engine 19 (FIGS. 3 and 4) is of the air-cooled type as shown, for example, in the patent to Lechtenberg, No. 2,796,053, issued on June 18, 1957, and comprises an engine block 17 having cooling fins 18 thereon, a carburetor 20, an exhaust conduit 21 for conveying exhaust gases from the engine and a drive pulley 22, the latter being mounted on the engine crank shaft. The pulley 22 forms part of the power transmission mechanism which includes a belt 23, a driven pulley 24 and gearing, generally indicated at 25, suitably entrained with the rear wheels.

The engine crankshaft 26 (FIG. 6) carries, at the forward end of the engine, a combined centrifugal blower and flywheel 27. As disclosed in the patent to Coughlin et al., No. 2,999,489, issued on September 12, 1961, the crankshaft is coupled through a one-way clutch, generally indicated at 28, to a splined shaft 30 rotatably mounted on the crankshaft. The shaft 30 carries a hub 31 splined thereto and attached to the inner end of a coiled torsion spring 32. The outer end of the latter spring is attached to a spring drum 33 which is rotatably mounted in a bearing formed in a stationary ratchet wheel 34 suitably attached to a cage 36 forming part of a shroud 37 (see also FIG. 3) surrounding the engine. The shroud directs air from the blower 27 over the cooling fins of the engine block for cooling purposes. A ratchet wheel 35 and disc 38 are fixed to the drum 33. The disc 38 carries a backup preventing pawl 39 which cooperates with the ratchet wheel 34 while the ratchet wheel 35 cooperates with a drive pawl 41 carried by a cable sheave 42. The latter is rotatably mounted on a bearing bolt 43 secured to the spring drum 33. The sheave is yieldably held in a normal position by a coiled tension spring 44 which is attached at its inner end to a hub of sheave 42 and at its outer end to one wall of an air intake chamber 45. The latter is suitably secured to the shroud 37 and has an opening 49 in the opposite wall thereof which communicates with the interior of the shroud through a dirt screen 93.

A starter cable 46 is suitably attached at one end to the sheave 42 and is wrapped several times therearound.

The engine is adapted to be locked against rotation for starting purposes by a locking device generally indicated at 50 (FIG. 7). The latter comprises a plunger 51 slideable axially in a cylinder 52, the latter having a camming slot 158 which embraces a pin 1159 of the plunger 51 as more completely disclosed in the above Coughlin et al. Patent 2,999,489. A camming sleeve 53 rotatably mounted on the cylinder 52 has a camway 161 which also embraces the pin 1159, so as to cam the pin 1159 along the slot 158 thereby moving the plunger in and out of locking relation with the blower 27 by controls to be described later.

Considering the locking plunger to be in its locking condition shown in FIG. 7, when the starting cable 46 is pulled by a control to be described later, the sheave 42 will be rotated against the action of spring 44 causing pawl 41 to advance the spring drum 33, thereby partially winding the spring 32. Upon release of the cable, the pawl 38 will prevent retrograde rotation of the spring drum while the pawl 41 will permit retrograde rotation of the sheave to its initial position to which it is returned by the spring 44. After several advancements of the cable, the spring 32 is tightened sufficiently to drive the engine during an engine starting operation. Starting of the engine is effected by turning the sleeve member 53 to retract the plunger 51, thereby permitting the spring 32 to drive the crank shaft 26 through the splined shaft 30 and the one-way clutch 28. However, during operation of the engine, the clutch 28 permits rotation of the crank shaft relative to the splined shaft.

In accordance with the present invention, means are provided for facilitating starting of the engine by the driver while in seated position. For this purpose, the free end of cable 46 is guided around pulleys 54, 55 and 56 and terminates in a handle 57 located in a compartment 58 within easy reach of the driver. The compartment is normally closed by a door 60 pivoted at 61 on the rear wall of the forward body part 14.

Figure 5:
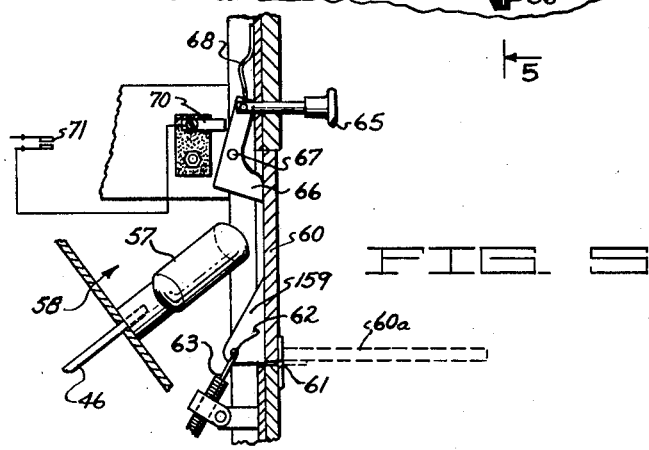
FIG. 5 is a sectional view taken substantially along the line 5—5 of FIG. 4 illustrating the compartment enclosing the engine starting handle.

The door 60 has an arm 159 attached at 62 to the upper end of a Bowden cable 63 whose lower end is secured to an arm 64 on the plunger control sleeve member 53. Thus, when the door is moved to an open position, indicated by the dotted lines 60a (FIG. 5), the sleeve 53 will be rotated to advance the locking plunger 51 into locking engagement with the blower 27 to thus lock the engine against rotation.

The door 60 is opened by a pushbutton 65 pivotally attached to a bell crank 66 which is pivotally supported at 67. Upon pressing inward on the button 65 against the action of a leaf spring 68, the bell crank 66 will force the door 60 open sufficiently so that it may be manually grasped and moved to its open position.

The pushbutton 65 is also effective to disable the engine in the event it is running when the door 60 is to be opened. For this purpose, the bell crank 66, when operated by the pushbutton, contacts an electrical terminal 70 connected in circuit with breaker points 71 located in the ignition circuit of the engine to accordingly short out the ignition system. Thus, adequate time is allowed between the pressing of the bushbutton 65 and manual opening of the door 60 to its open position to enable the engine to come to rest before the plunger 51 is moved to locking position. If desired, and in lieu of the connection of terminal 70 to the breaker points 71, the terminal may be connected to the spark plug 59 of the engine to short out the latter.

After the starting spring 32 has been tightened and the handle 57 allowed to retract into the compartment 58, the door 60 is closed, thereby withdrawing the plunger 51 so that the spring may become effective to start the engine.

It will be noted that the engine is enclosed by a casing 72 having walls of sound-proofing material to muffle engine sounds. The top wall is also formed of sound-proofing material and is attached to the bottom of the seat 9 which is removable to permit servicing of the engine. The casing 72 effectively seals the engine except for a small drain hole 69 in the bottom wall thereof to permit drainage of any gasoline or oil that might escape from the engine.

In accordance with the present invention two elongated compartments 73 and 74, forming sides of the rear body part 15, are mounted on opposite sides of the casing 72. The walls of the latter compartments are also lined with sound-proofing material 90 and are shaped to form fender wells 75 preventing dirt, mud, etc., from being thrown upward by the rear wheels 13.

The compartment 73 is provided with an air intake opening 76 (FIG. 2) at its rear end and communicates at its forward end through a flexible conduit 77 with the interior of the chamber 45. A dirt and dust filter 78 is removably mounted in the compartment to filter air passing into the engine compartment. The compartment may be lined with sound absorbing material to reduce emanation of engine sounds through the intake opening 76.

A second centrifugal blower 80 (FIG. 8) is attached to the rear end of the crank shaft 26 and operates within a blower casing 81 having its outlet 82 communicating through a flexible conduit 183 with the interior of the compartment 74 midway between the ends of the latter. The conduit 183 is formed to direct the exhaust gases forwardly in the compartment 74. The latter may have a baffle 84 therein extending forwardly of the inlet for extending the path of air and exhaust gases being fed through the compartment and into the atmosphere through an exhaust opening 85 (FIG. 2).

As shown in FIGS. 4 and 8, the exhaust conduit 21 is surrounded by a heat insulating jacket 86 of asbestos or the like and is extended into the blower casing 81, terminating adjacent the outlet of the latter.

During operation of the engine, the fan blower 27 draws air from the inlet 76, through the silencing and filtering compartment 73 and conduit 77 to force the same over the engine for cooling purposes. The air intake of the carburetor 20 is connected through a short conduit 87 (FIGS. 4 and 6) to the interior of the intake chamber 45 to thus supply the carburetor with filtered air. The relatively long sound muffling compartment 73 effectively muffles any sound which might tend to be transmitted through the intake air passage leading to the engine.

The second blower 80 receives the engine cooling air after it has cooled the engine and forces the same past the outlet of the exhaust conduit 21 into and through the exhaust compartment 74. As the cooling air passes the exhaust gas outlet, the exhaust gases are dissipated thereinto. The venturi effect thus created eliminates any back-pressure against the exhaust conduit and, at the same time, absorbs the exhaust gas pulsations which would otherwise create an undesired staccato sound. Due to the mixture of engine cooling air and exhaust gases and their passage along the relatively large and long exhaust compartment 74, the sound of the exhaust is effectively silenced. It should be noted that the mixing of the hot exhaust gases and the much larger volume of cooling air reduces the temperature of the exhaust so that a sound absorbing material may be lined along the interior of the compartment 74 without danger of igniting the same. Also, since the exhaust gases are effectively diluted by the cooling air, any corrosive or other chemical effect thereof on the sound absorbing lining is eliminated or at least materially reduced. The exhaust compartment 74 may therefore be lined with such sound absorbing material as fiberglass to aid in absorbing exhaust sounds. Also, it will be seen in FIGS. 1 and 2 that the wall 91 of the exhaust compartment is irregularly shaped, thereby tending to break up any resonant or reinforced reflection of any sound waves emanating into the compartment 74.

Although the invention has been described in detail and certain specific terms and languages have been used, it is to be understood that the present disclosure is illustrative rather than restrictive and that changes and modifications may be made without departing from the spirit or scope of the invention as set forth in the claims appended hereto.

Having thus described the invention, what is desired to be secured by United States Letters Patent is:

1. A self-propelled vehicle comprising the combination of a frame, wheels supporting said frame, an air-cooled internal combustion engine supported by said frame for driving at least one of said wheels, an exhaust conduit for said engine, an engine compartment surrounding said engine, side compartments forming fender wells extending over at least certain of said wheels and juxtaposed opposite sides of said engine compartment, each of said side compartments forming a silencing chamber having an inlet and an outlet, means for blowing air from the outlet of one of said chambers into said engine compartment whereby to cool said engine, said exhaust conduit opening into the other of said chambers, and means for blowing said air from the interior of said compartment into said inlet of the other of said chambers.

2. A self-propelled vehicle comprising the combination of a frame, wheels supporting said frame, an air cooled internal combustion engine supported by said frame, an exhaust conduit for said engine, means forming a driving connection between said engine and at least certain of said wheels, a body on said frame including an engine compartment surrounding said engine, side compartments forming fender wells extending over at least certain of said wheels and contiguous with opposite sides of said engine compartment, said side compartments forming the sides of said body, each of said compartments forming a silencing chamber having an inlet and an outlet, means for blowing air from the outlet of one of said chambers into said engine compartment whereby to cool said engine, said exhaust conduit opening into the inlet of the other of said chambers, and means for blowing said air from the interior of said compartment into said inlet of the other of said chambers.

3. A self-propelled vehicle comprising the combination of a frame, wheels supporting said frame, an air cooled internal combustion engine supported by said frame, means forming a driving connection between said engine and at least certain of said wheels, an exhaust conduit for said engine, a body on said frame including an engine compartment surrounding said engine, side compartments forming fender wells extending over at least certain of said wheels and contiguous with opposite sides of said engine compartment, said side compartments forming the sides of said body, each of said compartments forming a silencing chamber having an inlet and an outlet, a blower driven by said engine for blowing air from the outlet of one of said chambers into said engine compartment whereby to cool said engine, and a second blower driven by said engine for blowing air from the interior of said engine compartment into the inlet of the other of said chambers, said exhaust conduit opening into the outlet of said second blower.

4. A self-propelled vehicle comprising the combination of a frame, wheels supported by said frame, an air cooled internal combustion engine supported by said frame, means forming a driving connection between said engine and at least certain of said wheels, an exhaust conduit for said engine, a body on said frame including an engine compartment surrounding said engine, side compartments forming fender wells extending over at least certain of said wheels and contiguous with opposite sides of said engine compartment, said side compartments forming the sides of said body, each of said compartments forming a silencing chamber having an inlet and an outlet, means communicating the outlet of one of said chambers with the interior of said compartment whereby to convey cooling air to cool said engine, and a blower driven by said engine for exhausting said air from said engine compartment to the inlet of the other of said chambers, said exhaust conduit opening into the outlet of said blower whereby to discharge the exhaust gases from said engine to the air exhausted by said blower.

5. A self-propelled vehicle comprising the combination of a frame, wheels supporting said frame, an air cooled internal combustion engine supported by said frame, an exhaust conduit for said engine, means forming a driving connection between said engine and at least certain of said wheels, a body on said frame including an engine compartment surrounding said engine, a side compartment forming a fender well extending over one of said wheels and contiguous with one side of said engine compartment, said side compartment forming a side of said body, said side compartment forming a sound absorbing chamber having an inlet and an outlet, said exhaust conduit opening into said compartment, and means for blowing air from the interior of said compartment into said inlet of said chamber.

References Cited in the file of this patent

UNITED STATES PATENTS

| | | |
|---|---|---|
| 1,244,442 | Frazer | Oct. 23, 1917 |
| 1,322,069 | Spiro | Nov. 18, 1919 |
| 1,331,649 | Kettering | Feb. 24, 1920 |
| 1,333,331 | Moses | Mar. 9, 1920 |
| 1,560,351 | Seidel | Nov. 3, 1925 |
| 1,598,867 | Lundelius | Sept. 7, 1926 |
| 1,934,385 | Strauss | Nov. 7, 1933 |
| 2,078,420 | Sheldrick | Apr. 27, 1937 |
| 2,231,586 | Miller | Feb. 11, 1941 |
| 2,242,494 | Wolf | May 20, 1941 |
| 2,355,208 | Devol et al. | Aug. 8, 1944 |
| 2,402,087 | Rosales | June 11, 1946 |
| 2,456,512 | Johnson | Dec. 14, 1948 |
| 2,730,084 | Stegeman | Jan. 10, 1956 |
| 2,796,053 | Lechtenberg | June 18, 1957 |
| 2,864,960 | Von Linde et al. | Dec. 16, 1958 |
| 2,875,841 | Henderson | Mar. 3, 1959 |
| 2,901,052 | Rabe et al. | Aug. 25, 1959 |
| 2,999,489 | Coughlin et al. | Sept. 12, 1961 |
| 3,010,443 | Lyvers | Nov. 28, 1961 |

FOREIGN PATENTS

| | | |
|---|---|---|
| 887,262 | France | Aug. 9, 1943 |
| 870,112 | Great Britain | June 14, 1961 |